United States Patent
Ranta

(10) Patent No.: US 9,525,275 B2
(45) Date of Patent: Dec. 20, 2016

(54) PANELBOARD, AND SWITCHGEAR ASSEMBLY AND STAB ASSEMBLY THEREFOR

(71) Applicant: EATON CORPORATION, Cleveland, OH (US)

(72) Inventor: Michael John Ranta, Morton, IL (US)

(73) Assignee: EATON CORPORATION, Cleveland, OH (US)

( * ) Notice: Subject to any disclaimer, the term of this patent is extended or adjusted under 35 U.S.C. 154(b) by 178 days.

(21) Appl. No.: 14/571,382

(22) Filed: Dec. 16, 2014

(65) Prior Publication Data

US 2016/0172825 A1   Jun. 16, 2016

(51) Int. Cl.
*H02B 1/20* (2006.01)
*H02B 1/21* (2006.01)
*H02B 1/056* (2006.01)

(52) U.S. Cl.
CPC ............... *H02B 1/21* (2013.01); *H02B 1/056* (2013.01)

(58) Field of Classification Search
CPC ........ H01H 71/02; H02B 1/056; H02B 1/0565
USPC   361/601, 605, 611, 614, 627–656; 439/121, 212, 721
See application file for complete search history.

(56) References Cited

U.S. PATENT DOCUMENTS

| | | | | |
|---|---|---|---|---|
| 2,897,410 A | * | 7/1959 | Hammerly | H02B 1/056 361/636 |
| 3,356,906 A | | 12/1967 | Lamb et al. | |
| 3,402,328 A | * | 9/1968 | Gryctko | H02B 1/056 361/634 |
| 3,404,315 A | * | 10/1968 | Jacobs | H01R 13/35 200/294 |
| 4,002,388 A | * | 1/1977 | Menocal | H02B 1/21 174/72 B |
| 4,153,318 A | | 5/1979 | Bishop et al. | |
| 4,198,107 A | * | 4/1980 | Luke | H02B 1/21 361/637 |
| 4,205,892 A | * | 6/1980 | Clement | H02B 1/056 361/652 |

(Continued)

OTHER PUBLICATIONS

PanelFAST Brochure, Schneider Electric USA, Inc., Jun. 2013.
NQ Circuit Breaker Panelboards Catalog, by Schneider Electric, USA, 2008.

*Primary Examiner* — Briggitte R Hammond
*Assistant Examiner* — Milagros Jeancharles
(74) *Attorney, Agent, or Firm* — Eckert Seamans; John Powers; Grant Coffield

(57) ABSTRACT

A stab assembly is for a switchgear assembly of a panelboard. The stab assembly includes: a bus bar having: a mounting portion located on a backpan, the mounting portion including a number of edges each defining an aperture, and a number of elongated extensions each extending from the mounting portion into a corresponding electrical switching apparatus, the elongated extensions including a plug-on elongated extension; and a number of line terminals including a twofold line terminal, the twofold line terminal having: a bolt-on portion engaging the mounting portion, the bolt-on portion having an edge defining a thru hole, the edge of the bolt-on portion substantially overlaying one of the edges of the mounting portion, and a plug-on portion extending from the bolt-on portion, the plug-on portion having an engaging portion. The engaging portion substantially overlays the plug-on elongated extension. The engaging portion engages the plug-on elongated extension.

20 Claims, 8 Drawing Sheets

(56) References Cited

U.S. PATENT DOCUMENTS

| | | | |
|---|---|---|---|
| 4,358,815 A | 11/1982 | Koslosky et al. | |
| 4,468,547 A * | 8/1984 | Belttary | H01H 71/08 200/294 |
| 4,532,574 A | 7/1985 | Reiner et al. | |
| 5,047,604 A | 9/1991 | Grass et al. | |
| 7,580,247 B1 * | 8/2009 | Pearson | H02B 1/056 174/149 B |

* cited by examiner

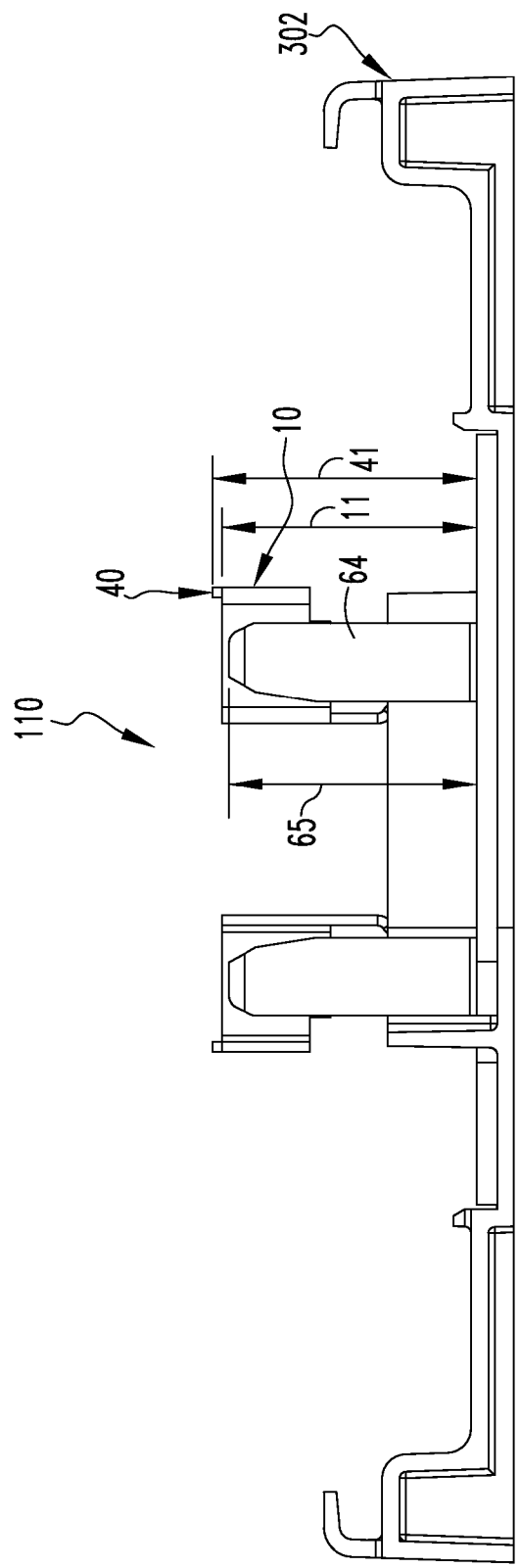

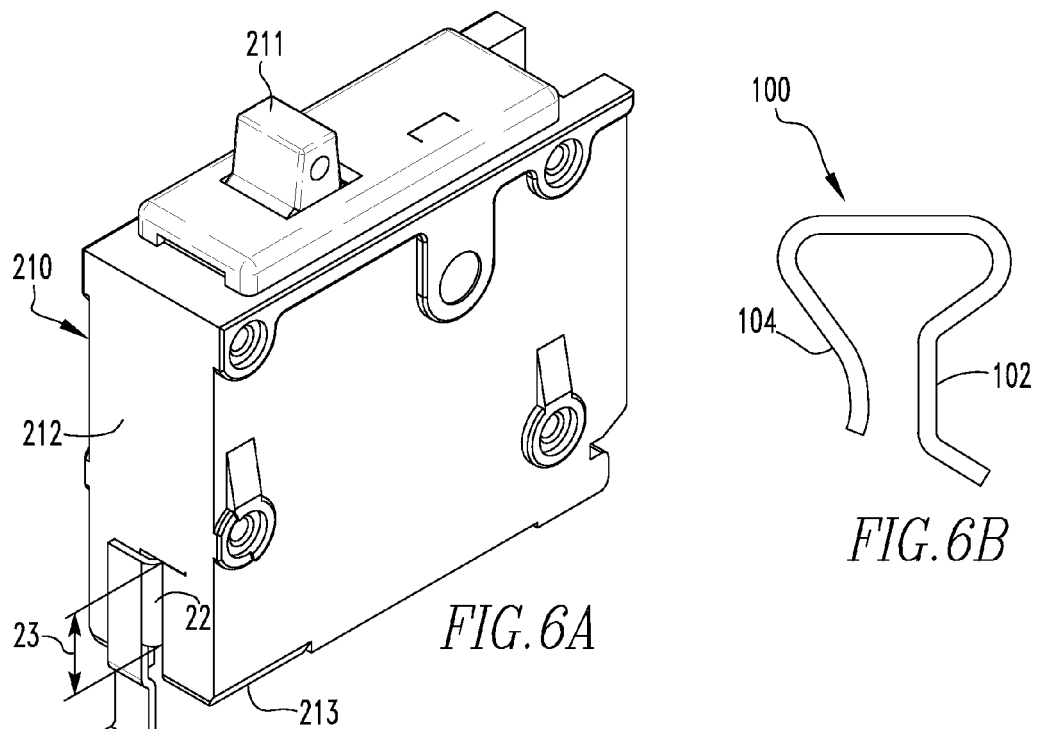
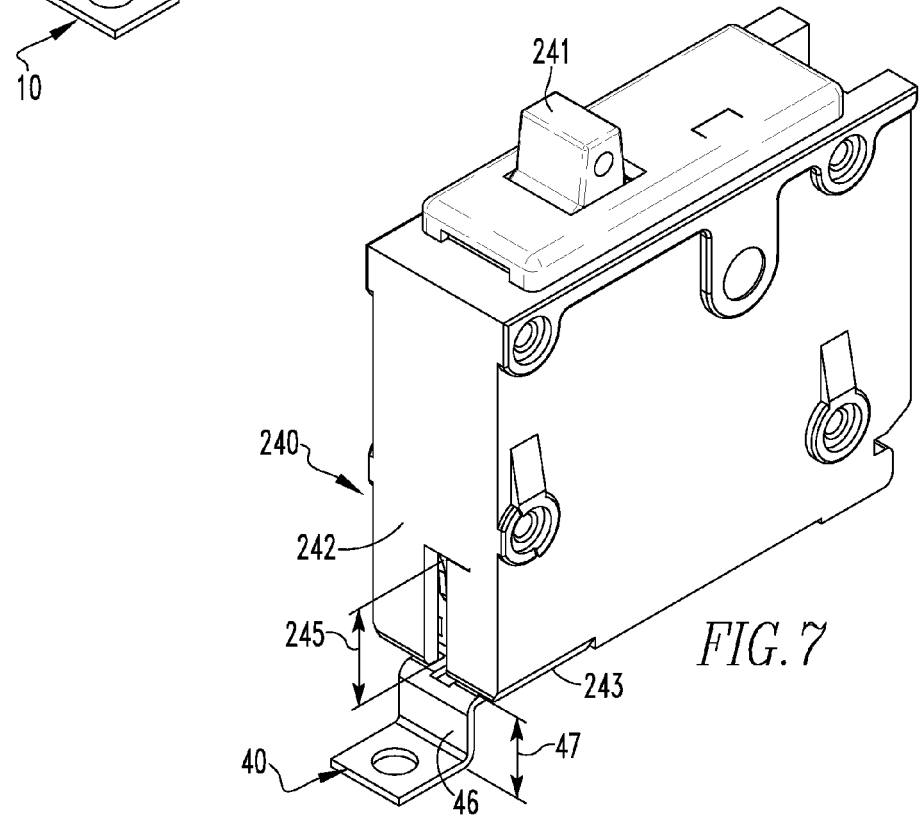

PANELBOARD, AND SWITCHGEAR ASSEMBLY AND STAB ASSEMBLY THEREFOR

BACKGROUND

Field

The disclosed concept pertains generally to electrical enclosures and, more particularly to electrical enclosures, such as for example, panelboards. The disclosed concept also pertains to switchgear assemblies for panelboards. The disclosed concept further pertains to stab assemblies for switchgear assemblies.

Background Information

Electrical apparatus, such as electrical switching apparatus or electrical meters used in power distribution systems, are often mounted on or within an electrical enclosure (e.g., without limitation, a panelboard; a load center; a meter breaker panel) either individually or in combination with other electrical meters or switchgear (e.g., without limitation, circuit switching devices and circuit interrupters such as circuit breakers, contactors, motor starters, motor controllers and other load controllers). The electrical enclosure is typically coupled to and supported by a structure such as, for example, a wall of a building, and includes a number of electrical bus members.

Residential panelboards, for example, include a number of electrical bus members having a plurality of elongated bus stabs extending outwardly therefrom. Typically, a plurality of circuit breakers or other suitable electrical switching apparatus are mechanically coupled and electrically connected to the elongated bus stabs and, in turn, to the electrical bus members within the electrical enclosure. Known methods of mechanically coupling such electrical switching apparatus to the elongated bus stabs include employing springs that allow the electrical switching apparatus to plug-on (e.g., attach or connect without requiring a separate fastener) to the corresponding elongated bus stab. However, such panelboards are undesirably limited in their capability. More specifically, these panelboards are not equipped to accommodate electrical switching apparatus that rely on a bolt-on connection.

Similarly, panelboards for commercial applications are undesirably limited in their capability. Typically, these panelboards include a plurality of circuit breakers that are bolted to corresponding bus bars. For example, the panelboards include a corresponding line terminal for each electrical switching apparatus, and a bolt that bolts the line terminal to the bus bar. However, these panelboards are not equipped to accommodate electrical switching apparatus that rely on a plug-on connection, as discussed above.

There is, therefore, room for improvement in panelboards, and in switchgear assemblies and stab assemblies therefor.

SUMMARY

These needs and others are met by embodiments of the disclosed concept, which are directed to a panelboard, and switchgear assembly and stab assembly therefor, which among other benefits, are adapted to accommodate a wide variety of different electrical switching apparatus.

In accordance with one aspect of the disclosed concept, a stab assembly for a switchgear assembly of a panelboard is provided. The panelboard includes a backpan. The switchgear assembly includes a number of electrical switching apparatus each disposed on the backpan. The stab assembly comprises: at least one bus bar comprising: a mounting portion disposed on the backpan, the mounting portion comprising a number of edges each defining a respective aperture, and a number of elongated extensions each extending from the mounting portion into a corresponding one of the number of electrical switching apparatus, the number of elongated extensions comprising a plug-on elongated extension; and a number of line terminals comprising at least one twofold line terminal, the twofold line terminal comprising: a bolt-on portion engaging the mounting portion, the bolt-on portion having an edge defining a thru hole, the edge of the bolt-on portion substantially overlaying a corresponding one of the edges of the mounting portion, and a plug-on portion extending from the bolt-on portion, the plug-on portion comprising an engaging portion. The engaging portion substantially overlays the plug-on elongated extension. The engaging portion engages the plug-on elongated extension.

As another aspect of the disclosed concept, a switchgear assembly for a panelboard is provided. The panelboard includes a backpan. The switchgear assembly comprises: a number of electrical switching apparatus each disposed on the backpan; and a stab assembly comprising: at least one bus bar comprising: a mounting portion disposed on the backpan, the mounting portion comprising a number of edges each defining a respective aperture, and a number of elongated extensions each extending from the mounting portion into a corresponding one of the number of electrical switching apparatus, the number of elongated extensions comprising a plug-on elongated extension, and a number of line terminals comprising at least one twofold line terminal, the twofold line terminal comprising: a bolt-on portion engaging the mounting portion, the bolt-on portion having an edge defining a thru hole, the edge of the bolt-on portion substantially overlaying a corresponding one of the edges of the mounting portion, and a plug-on portion extending from the bolt-on portion, the plug-on portion comprising an engaging portion. The engaging portion substantially overlays the plug-on elongated extension. The engaging portion engages the plug-on elongated extension.

As another aspect of the disclosed concept, a panelboard is provided. The panelboard comprises: a backpan; and a switchgear assembly comprising: a number of electrical switching apparatus each disposed on the backpan; and a stab assembly comprising: at least one bus bar comprising: a mounting portion disposed on the backpan, the mounting portion comprising a number of edges each defining a respective aperture, and a number of elongated extensions each extending from the mounting portion into a corresponding one of the number of electrical switching apparatus, the number of elongated extensions comprising a plug-on elongated extension, and a number of line terminals comprising at least one twofold line terminal, the twofold line terminal comprising: a bolt-on portion engaging the mounting portion, the bolt-on portion having an edge defining a thru hole, the edge of the bolt-on portion substantially overlaying a corresponding one of the edges of the mounting portion, and a plug-on portion extending from the bolt-on portion, the plug-on portion comprising an engaging portion. The engaging portion substantially overlays the plug-on elongated extension. The engaging portion engages the plug-on elongated extension.

BRIEF DESCRIPTION OF THE DRAWINGS

A full understanding of the disclosed concept can be gained from the following description of the preferred embodiments when read in conjunction with the accompanying drawings in which:

FIG. 5C is a side elevation view of the stab assembly of FIGS. 5A and 5B, and shown without the springs, in accordance with embodiments of the disclosed concept;

FIG. 6A is a front isometric view of a twofold electrical switching apparatus, shown with the twofold line terminal of FIGS. 1A and 1B;

FIG. 6B is a side elevation view of a spring of the twofold electrical switching apparatus of FIG. 6A;

FIG. 7 is a front isometric view of a onefold electrical switching apparatus, shown with the onefold line terminal of FIGS. 2A and 2B.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

As employed herein, the adjective "onefold," such as used in the phrase a "onefold line terminal" or a "onefold electrical switching apparatus" shall mean that the modified component has only one of a bolt-on aspect or a plug-on aspect for coupling the modified component to another component, such as a bus bar.

As employed herein, the adjective "twofold," such as used in the phrase a "twofold line terminal" or a "twofold electrical switching apparatus" shall mean that the modified component has both a bolt-on aspect and a plug-on aspect for coupling the modified component to another component, such as a bus bar.

Figure 1A:
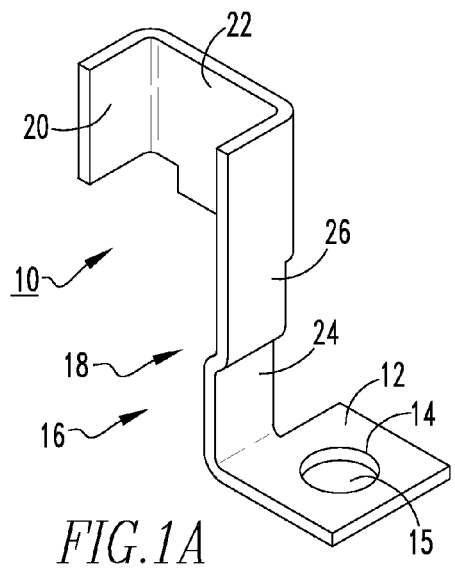
FIGS. 1A and 1B are front isometric and side elevation views, respectively, of a twofold line terminal, in accordance with embodiments of the disclosed concept.
Figure 1B:
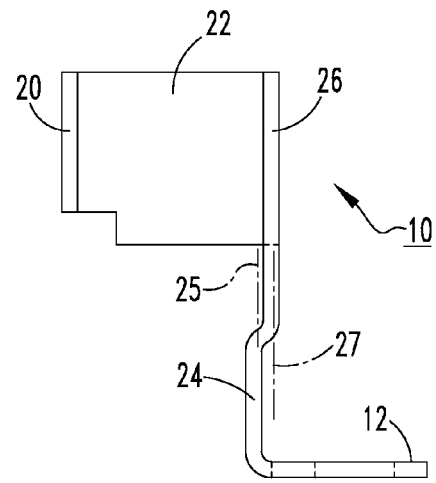
Figure 2A:
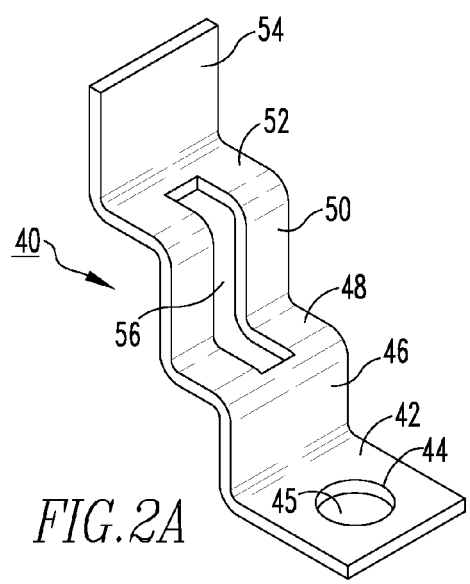
FIGS. 2A and 2B are front isometric and side elevation views, respectively, of a onefold line terminal, in accordance with embodiments of the disclosed concept.
Figure 2B:
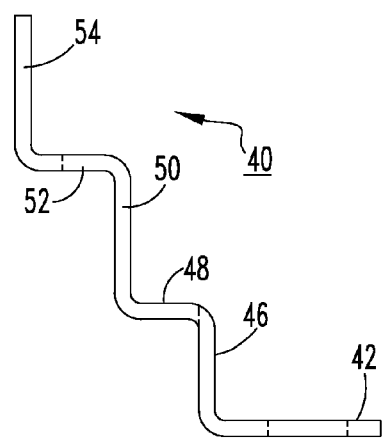
Figure 4A:
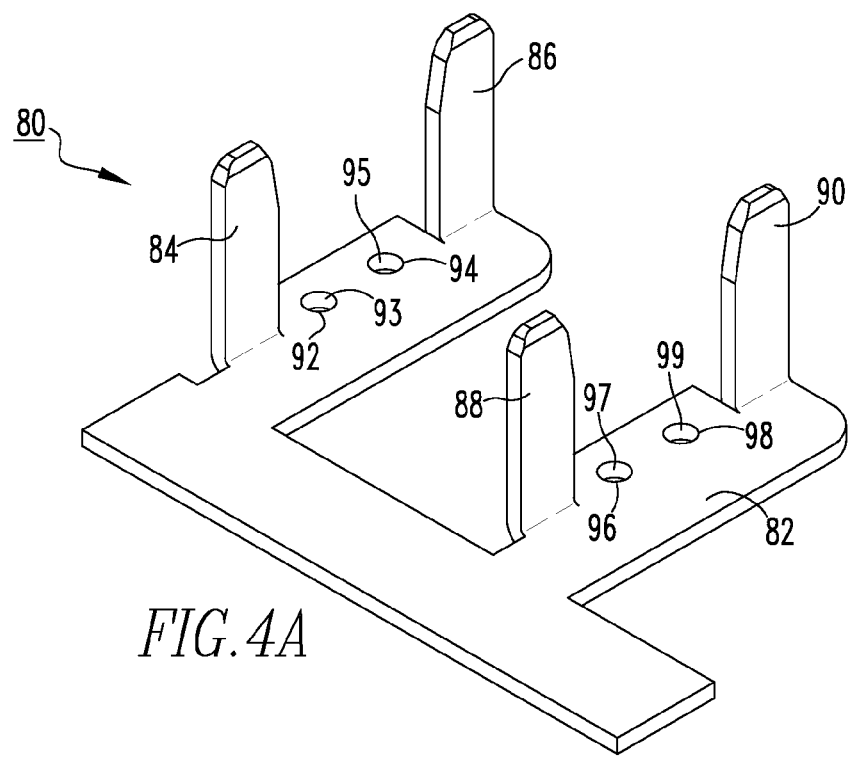
FIGS. 4A and 4B are front isometric and top plan views, respectively, of another bus bar, in accordance with embodiments of the disclosed concept.
Figure 4B:
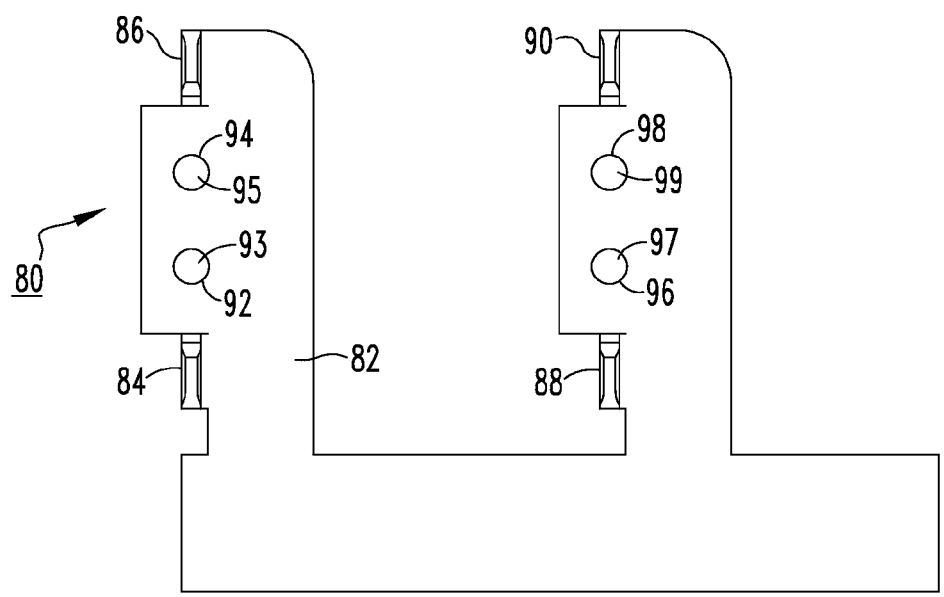
Figure 8A:
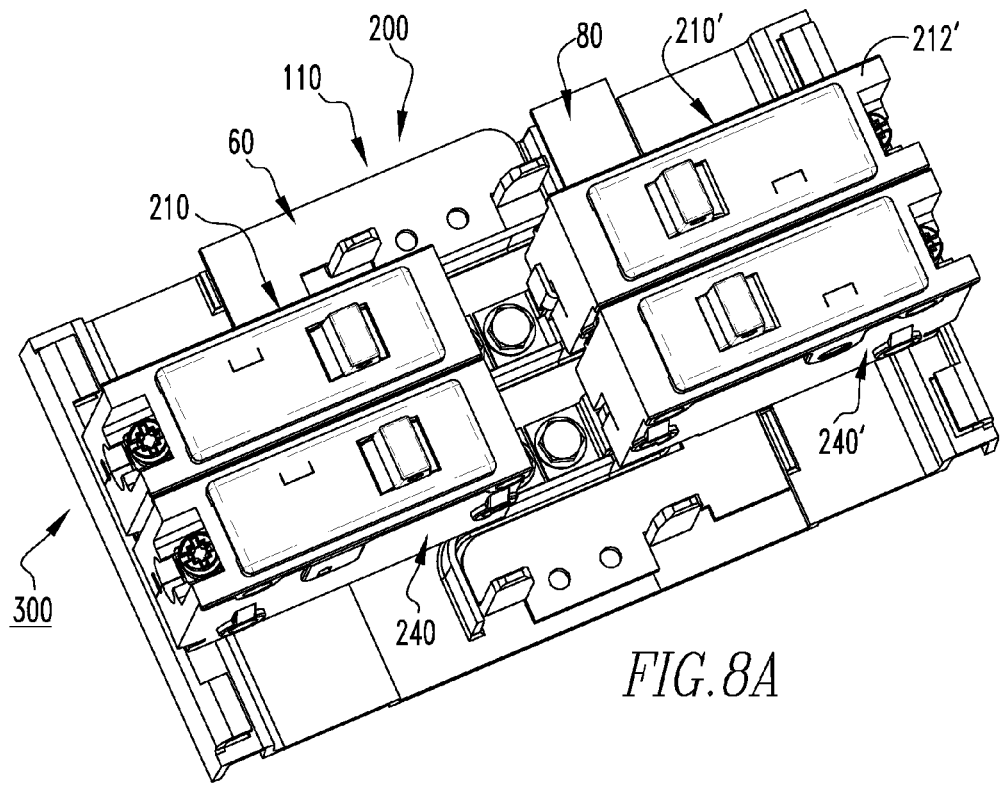
FIGS. 8A and 8B are different isometric views of a panelboard, and switchgear assembly and stab assembly therefor, in accordance with embodiments of the disclosed concept.
Figure 8B:
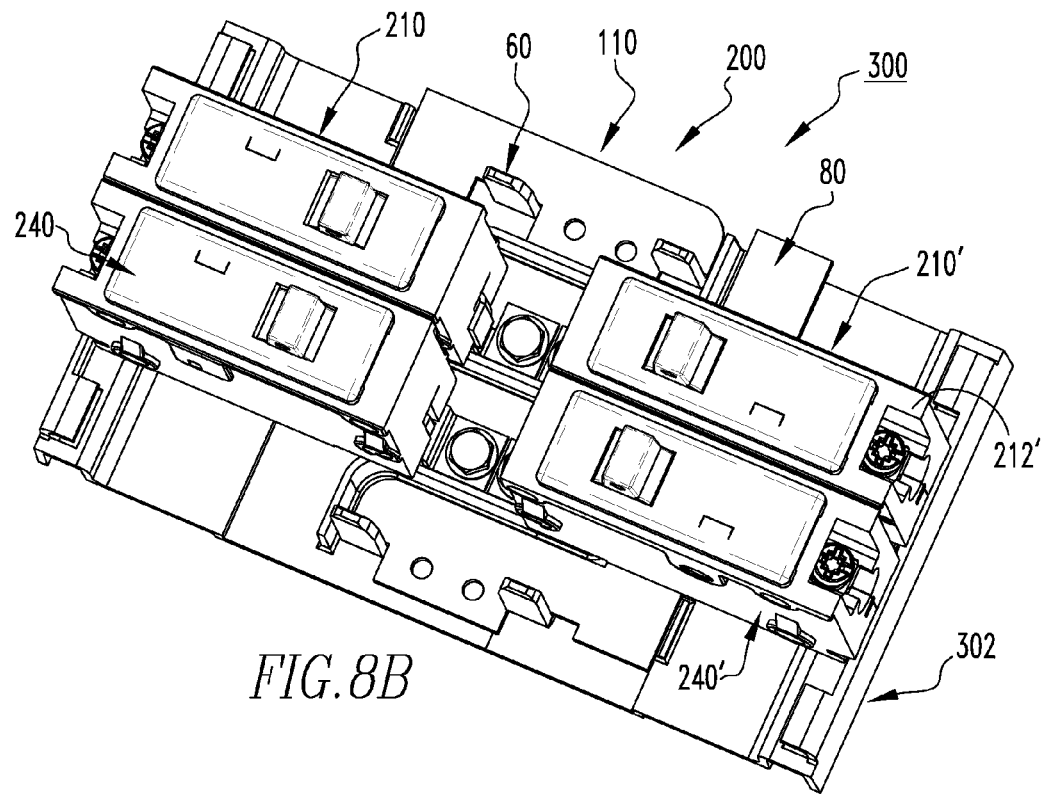

FIGS. 1A and 1B show a non-limiting embodiment of a twofold line terminal 10. FIGS. 2A and 2B show a non-limiting embodiment of a onefold line terminal 40. As will be discussed in greater detail hereinbelow, the line terminals 10,40 advantageously allow a number of twofold electrical switching apparatus 210,210' (FIGS. 8A and 8B) and a number of onefold electrical switching apparatus 240,240' (FIGS. 8A and 8B) to be accommodated in a switchgear assembly 200 (FIGS. 8A and 8B) of a panelboard 300 (FIGS. 8A and 8B). The example twofold line terminal 10 includes a bolt-on portion 12 and a plug-on portion 16. For this reason, an electrical switching apparatus, such as the example twofold electrical switching apparatus 210 (FIGS. 6A, 8A and 8B), that is coupled to the twofold line terminal 10, can advantageously be bolted and plugged onto a bus bar, such as an example bus bar 80 (FIGS. 4A and 4B). In this manner, there are more contact surfaces between the twofold line terminal 10 and the bus bar 80 (FIGS. 4A and 4B). Thus, if one contact surface is compromised in any manner, current can still be safely transferred through the other contact surface, as will be discussed below.

The bolt-on portion 12 has an edge 14 that defines a thru hole 15, which allows the twofold line terminal 10 to be bolted to the bus bar 80 (FIGS. 4A and 4B). The plug-on portion 16 allows the twofold line terminal 10 to be plugged onto the bus bar 80 (FIGS. 4A and 4B). The plug-on portion 16 includes a pair of opposing retaining portions 18,20, and an engaging portion 22 extending from the first retaining portion 18 to the second retaining portion 20. The retaining portions 18,20 advantageously allow the twofold line terminal 10 to be maintained on a housing 212 (FIG. 6A) of the twofold electrical switching apparatus 210 (FIG. 6A). The first retaining portion 18 includes a first wall 24 that extends from the bolt-on portion 12, and a second wall 26 that extends from the engaging portion 22. As shown in FIG. 1B, the walls 24,26 are located in respective planes 25,27. The first plane 25 is spaced apart from and parallel to the second plane 27 in order to accommodate a respective bolt (see for example bolt 112 in FIG. 5B) without any undesirable obstruction.

Figure 3A:
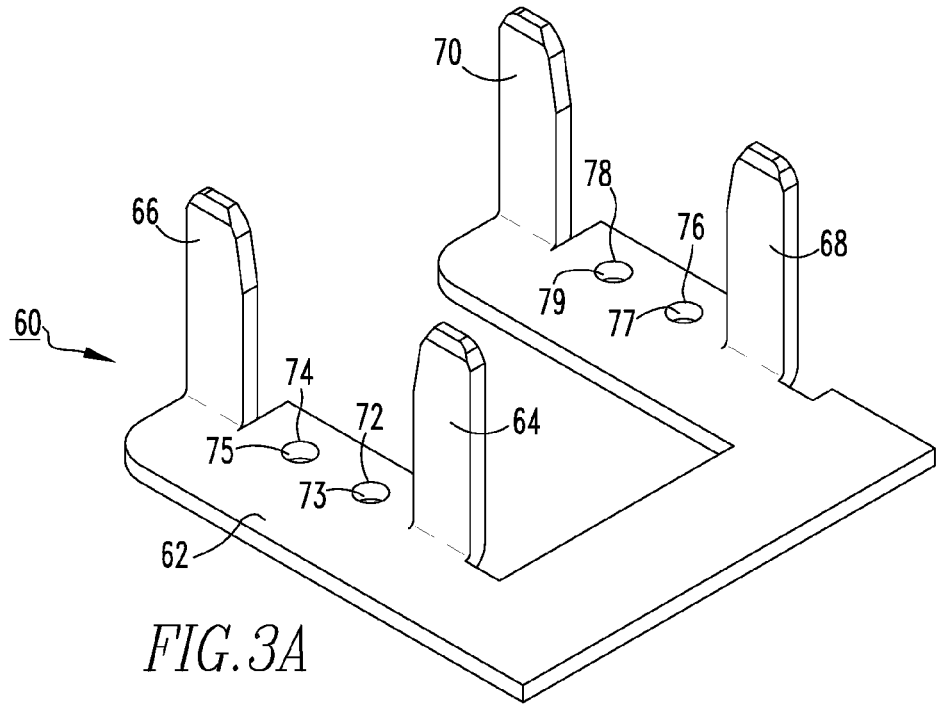
FIGS. 3A and 3B are front isometric and top plan views, respectively, of a bus bar, in accordance with embodiments of the disclosed concept.
Figure 3B:
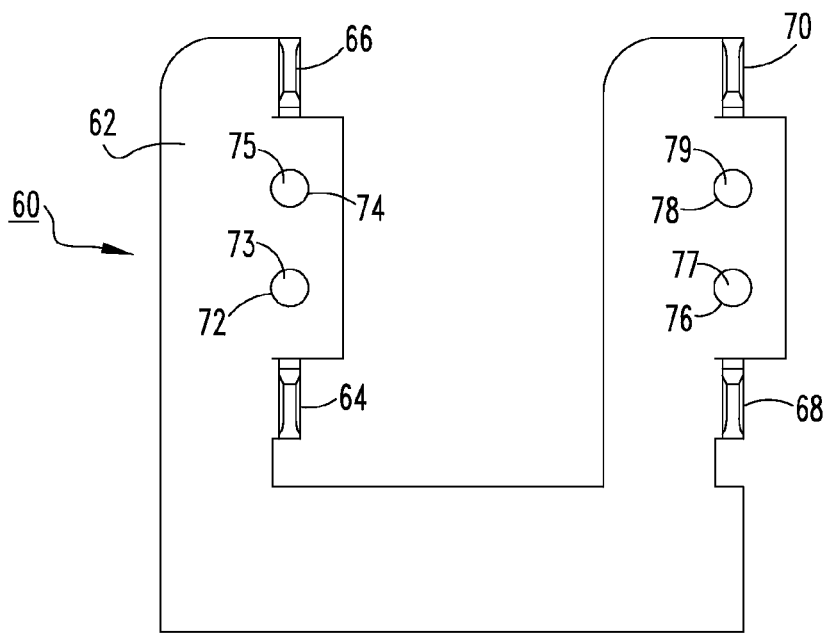

As shown in FIG. 2A, the example onefold line terminal 40 includes a bolt-on portion 42 that has an edge 44 defining a thru hole 45, which allows the onefold line terminal 40 to be bolted to a bus bar 60 (FIGS. 3A and 3B). The onefold line terminal 40 further includes a number of walls (five walls 46,48,50,52,54 are shown in FIGS. 2A and 2B). The first wall 46 connects the bolt-on portion 42 to the second wall 48. The second wall 48 connects the first wall 46 to the third wall 50. The third wall 50 connects the second wall 48 to the fourth wall 52. The fourth wall 52 connects the third wall 50 to the fifth wall 54. The walls 46,50,54 are each parallel to each other. The walls 48,52 are each parallel to each other, and perpendicular to the walls 46,50,54. Continuing to refer to FIG. 2A, the onefold line terminal 40 has a slot 56 that is located in the walls 48,50,52. In operation and as will be discussed in greater detail hereinbelow, the slot 56 allows the onefold electrical switching apparatus 240 (FIGS. 7, 8A and 8B) to be accommodated in the switchgear assembly 200 (FIGS. 8A and 8B).

FIGS. 3A and 3B show the bus bar 60. As shown, the bus bar 60 includes a mounting portion 62 and a number of elongated extensions 64,66,68,70 extending from the mounting portion 62. The mounting portion 62 has a number of edges 72,74,76,78 that each define a respective aperture 73,75,77,79. The edges 72,74 are located between the elongated extensions 64,66, and the edges 76,78 are located between the elongated extensions 68,70. Similarly, FIGS. 4A and 4B show the bus bar 80, which includes a mounting portion 82 and a number of elongated extensions 84,86,88, 90 extending from the mounting portion 82. The mounting portion 82 has a number of edges 92,94,96,98 that each define a respective aperture 93,95,97,99. The edges 92,94 are located between the elongated extensions 84,86, and the edges 96,98 are located between the elongated extensions 88,90. It will be appreciated that any of the elongated extensions 64,66,68,70,84,86,88,90 may be plug-on elongated extensions. Stated differently, one of the twofold electrical switching apparatus 210,210' (FIGS. 8A and 8B) or a onefold electrical switching apparatus (not shown) having a plug-on aspect, may plug onto any one of the elongated extensions 64,66,68,70,84,86,88,90.

Figure 5A:
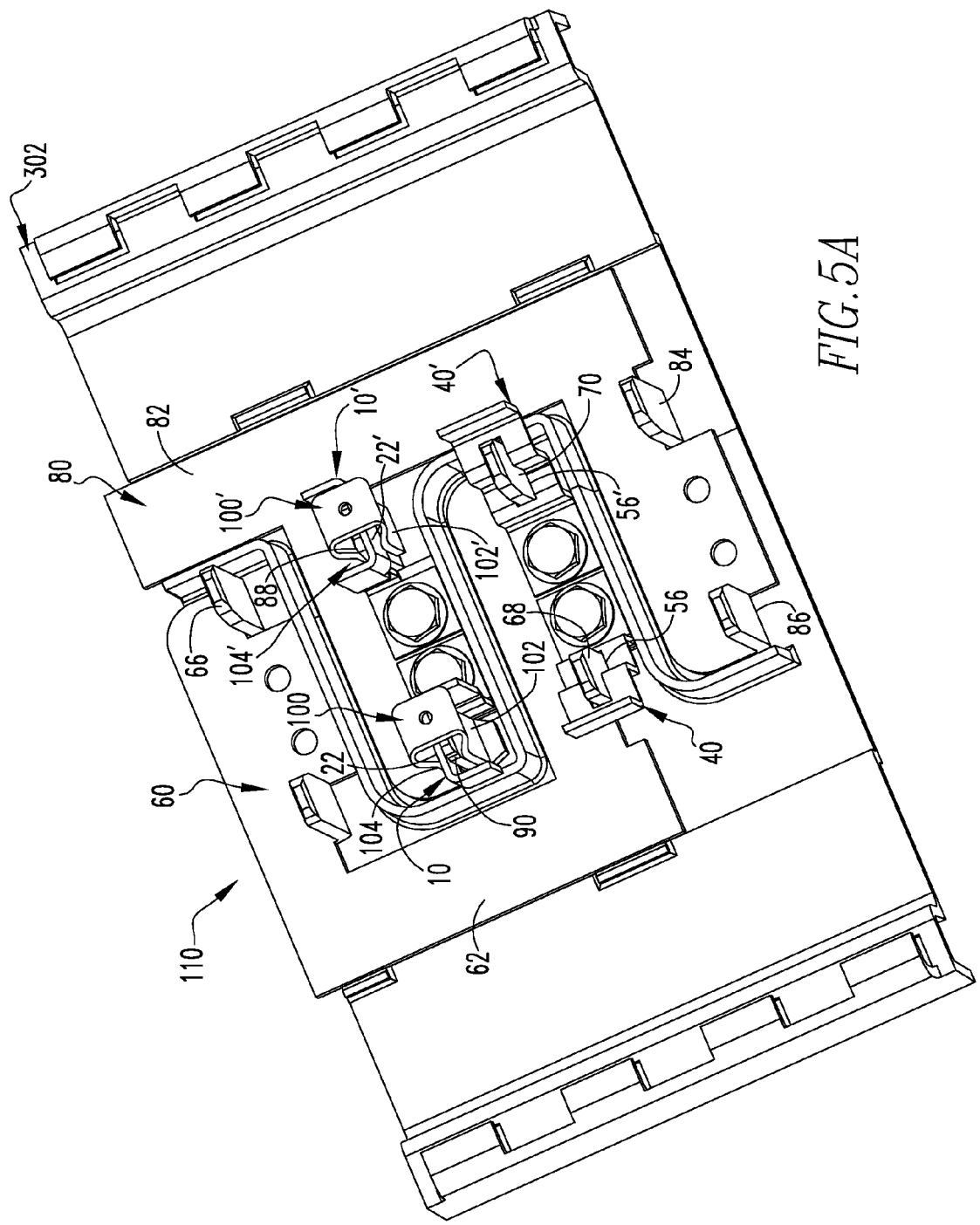
FIGS. 5A and 5B are isometric and top plan views, respectively, of a stab assembly, shown as employed on a backpan and with a number of springs, in accordance with embodiments of the disclosed concept.
Figure 5B:
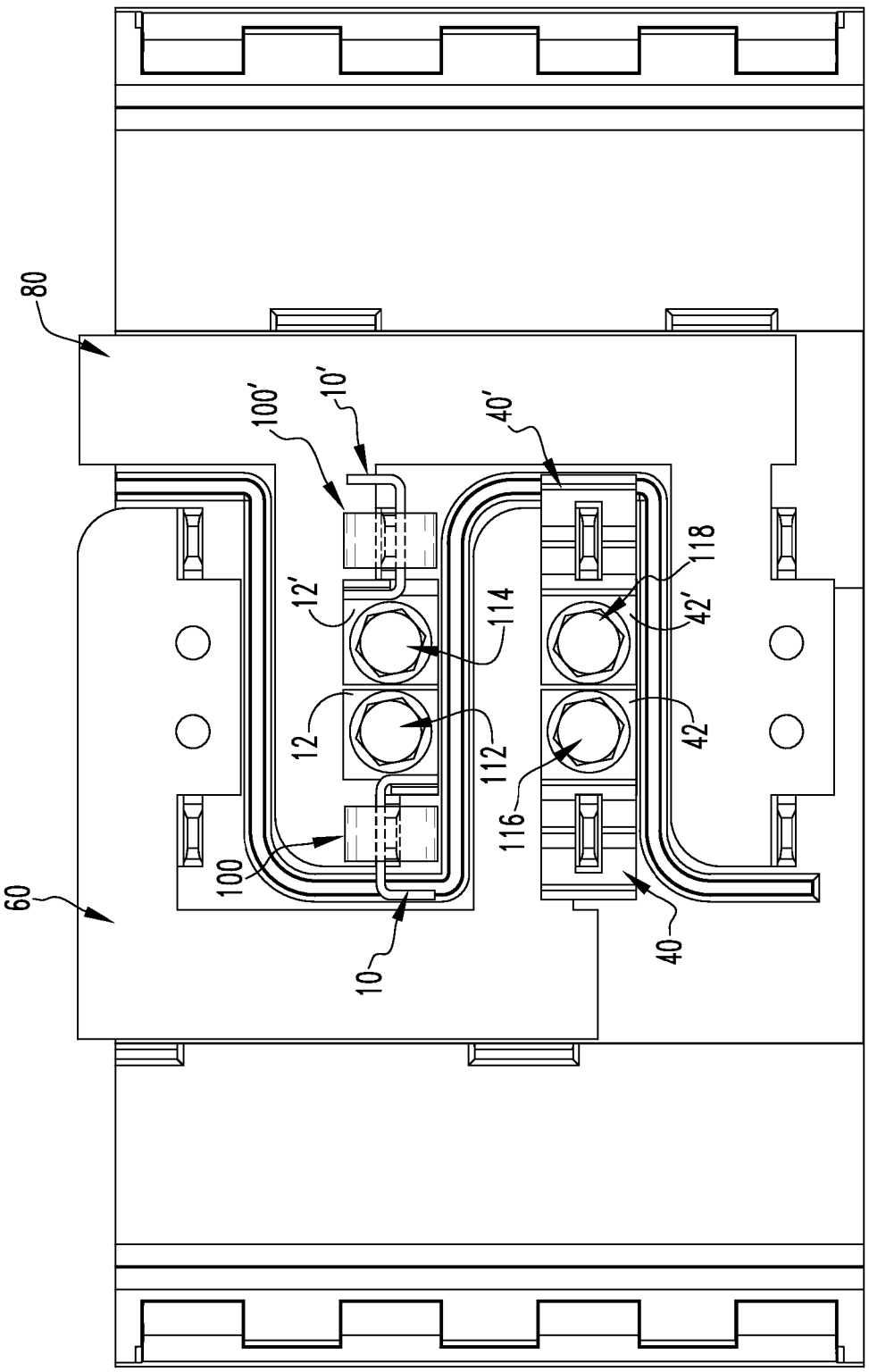

FIGS. 5A and 5B show a stab assembly 110, employed on a backpan 302 and with a number of springs 100,100'. The stab assembly 110 includes the line terminals 10,40, the bus bars 60,80, as well another twofold line terminal 10' and another onefold line terminal 40'. The mounting portions 62,82 of the respective bus bars 60,80 are mounted on the backpan 302. The edge 14 (FIGS. 1A and 1B) of the twofold line terminal 10 substantially overlays the edge 98 (FIGS. 4A and 4B) of the mounting portion 82 of the bus bar 80. The edge 44 (FIGS. 2A and 2B) of the onefold line terminal 40 substantially overlays the edge 76 (FIGS. 3A and 3B) of the mounting portion 62 of the bus bar 60. It will be appreciated that the respective edges (not shown) of bolt-on portions 12',42' of the line terminals 10',40' substantially overlay a corresponding one of the edge 96 (FIGS. 4A and 4B) of the bus bar 80, and the edge 78 (FIG. 3A and 3B) of the bus bar 60.

Referring to FIG. 5B, the stab assembly 110 further includes a number of bolts (four bolts 112,114,116,118 are shown and indicated). The bolts 112,114,116,118 each extend through a corresponding pair of the edges 14,98,44, 76,96,78,(and the respective edges (not shown) of the line terminals 10',40') in order to mechanically and electrically connect the respective line terminals 10,10',40,40' to the respective bus bars 60,80. Furthermore, the bolts 112,114, 116,118 are preferably threadably connected with the respective bus bars 60,80, advantageously providing a relatively strong mechanical connection.

As shown in FIG. 5C, the twofold line terminal 10 has a height 11. The elongated extension 64 has a height 65 that is generally the same as the height 11 of the twofold line terminal 10. Similarly, the onefold line terminal 40 has a height 41 that is generally the same as the respective heights 11,65 of the twofold line terminal 10 and the elongated extension 64. It will be appreciated with reference to FIGS. 5A, 5B and 5C that the elongated extensions 68,70,88,90 (FIGS. 3A, 3B 4A, 4B, 5A and 5B) likewise have a height that is generally the same as the height 11 of the twofold line terminal 10 and the height 41 of the onefold line terminal 40. The height 65 is preferably greater than 3/8 inches, which advantageously allows the twofold electrical switching apparatus 210,210' (FIGS. 6A, 8A and 8B) to plug-on to the elongated extensions 88,90, as will be discussed in greater detail hereinbelow. Similarly, as will be discussed below, the onefold electrical switching apparatus 240,240' (FIGS. 7, 8A and 8B) are able to receive the respective elongated extensions 68,70.

FIG. 6A shows the twofold electrical switching apparatus 210, which further includes the housing 212 and the spring 100 (see FIGS. 5A, 5B and 6B), which is located in the housing 212. As shown in FIG. 6B, the spring 100 includes a pair of clamping portions 102,104. Referring again to FIG. 5A, the engaging portion 22 of the twofold line terminal 10 substantially overlays the elongated extension 90. Additionally, the first clamping portion 102 engages the elongated extension 90, and the second clamping portion 104 engages the engaging portion 22 of the twofold line terminal 10. Thus, the spring 100, which pushes the engaging portion 22 of the twofold line terminal 10 into the elongated extension 90, advantageously allows the twofold line terminal 10 and the elongated extension 90 to be mechanically and electrically connected. Because the spring 100 is located inside the housing 212, the spring 100 clamps onto the elongated extension 90 and the engaging portion 22 inside the housing 212.

More specifically, the elongated extension 90 (FIGS. 4A, 4B, 5A and 5B) extends up into the housing 212 of the twofold electrical switching apparatus 210. Stated differently, the twofold electrical switching apparatus 210 has an operating switch 211 and a distal surface 213 located opposite the operating switch 211. As shown, the engaging portion 22 is located between the operating switch 211 and the distal surface 213. Thus, the elongated extension 90 (FIGS. 4A, 4B, 5A and 5B) is likewise located between the operating switch 211 and the distal surface 213. In other words, the elongated extension 90 (FIGS. 4A, 4B, 5A and 5B) extends from the distal surface 213 into the housing 212 at least as much as a corresponding height 23 of the engaging portion 22. Thus, the twofold electrical switching apparatus 210 (FIGS. 6A, and 8A and 8B) is plugged-on and bolted-on to the bus bar 80.

In this manner, if one of the contact locations is compromised, the other contact location can still transfer current safely. More specifically, if the electrical connection between the bolt-on portion 12 and the bus bar 80 is compromised, the electrical connection between the engaging portion 22 and the elongated extension 90 advantageously allows current to continue to be able to be transferred safely. Similarly, if the electrical connection between the engaging portion 22 and the elongated extension 90 is compromised, the electrical connection between the bolt-on portion 12 and the bus bar 80 advantageously allows current to continue to be able to be transferred safely. Furthermore, it will be appreciated that prior art onefold electrical switching apparatus (not shown) having a plug-on aspect can likewise plug-on to one of the elongated extensions 64,66, 68,70,84,86,88,90 (FIGS. 3A-4B).

Additionally, as shown in FIGS. 8A and 8B, the panelboard 300 includes the backpan 302 and the switchgear assembly 200. The switchgear assembly 200 includes the electrical switching apparatus 210,240, as well as another twofold electrical switching apparatus 210' and another onefold electrical switching apparatus 240', each of which is located on the backpan 302. The twofold electrical switching apparatus 210' includes a housing 212' and a spring 100' (shown in FIGS. 5A and 5B) located within the housing 212'. Referring again to FIGS. 5A and 5B, the spring 100' engages the elongated extension 88 and a corresponding engaging portion 22' of the twofold line terminal 10' in substantially the same manner in which the spring 100 engages the elongated extension 90 and the engaging portion 22 of the twofold line terminal 10. Thus, the twofold electrical switching apparatus 210' (FIGS. 8A and 8B) is plugged-on and bolted-on to the bus bar 80.

Referring again to FIGS. 5A and 5B, the elongated extension 68 extends through the slot 56 of the onefold line terminal 40, and the elongated extension 70 similarly extends through a corresponding slot 56' of the onefold line terminal 40'. It will be appreciated that the onefold line terminal 40 and the elongated extension 68 each extend into the onefold electrical switching apparatus 240 (FIGS. 7, 8A and 8B). Similarly, the onefold line terminal 40' and the elongated extension 70 extend into the onefold electrical switching apparatus 240' (FIGS. 8A and 8B).

It will be appreciated with reference to FIG. 7 that the elongated extension 68 (FIG. 5A) extends up into the housing 242 of the onefold electrical switching apparatus 240 a distance 245. As shown, the onefold electrical switching apparatus 240 includes an operating switch 241 and a distal surface 243 opposite the operating switch 241. The walls 50,52,54 (FIG. 2A and 2B) of the onefold line terminal 40 are located between the distal surface 243 and the operating switch 241. The distance 245 is generally the height 41 (FIG. 5C) of the onefold line terminal 40 minus a height 47 of the wall 46. Because the height 65 of the elongated extension 68 is generally the same as the height 41 of the onefold line terminal 40, the elongated extension 68 likewise extends from the distal surface 243 up into the housing 242 the distance 245. Thus, in addition to accepting the twofold electrical switching apparatus 210,210' and onefold electrical switching apparatus (not shown) having a plug-on aspect, the switchgear assembly 200 and panelboard 300 accept onefold electrical switching apparatus 240,240' having a bolt-on aspect.

Accordingly, it will be appreciated that the disclosed concept provides for an improved (e.g., without limitation, able to accommodate different electrical switching apparatus) panelboard 300 and switchgear assembly 200 and stab assembly 110 therefor, which among other benefits, allows the single panelboard 300 to accept different electrical switching apparatus (e.g., twofold electrical switching apparatus 210,210', onefold electrical switching apparatus 240, 240', or onefold electrical switching apparatus (not shown) having a plug-on aspect).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A stab assembly for a switchgear assembly of a panelboard, said panelboard comprising a backpan, said switchgear assembly comprising a number of electrical switching apparatus each disposed on said backpan, said stab assembly comprising:
    at least one bus bar comprising:
        a mounting portion structured to be disposed on said backpan, the mounting portion comprising a number of edges each defining a respective aperture, and
        a number of elongated extensions each being structured to extend from the mounting portion into a corresponding one of the number of electrical switching apparatus, said number of elongated extensions comprising a plug-on elongated extension; and
    a number of line terminals comprising at least one twofold line terminal, said at least one twofold line terminal comprising:
        a bolt-on portion engaging the mounting portion, the bolt-on portion having an edge defining a thru hole, the edge of the bolt-on portion substantially overlaying a corresponding one of the edges of the mounting portion, and
        a plug-on portion extending from the bolt-on portion, the plug-on portion comprising an engaging portion,
    wherein the engaging portion substantially overlays the plug-on elongated extension, and
    wherein the engaging portion engages the plug-on elongated extension.

2. The stab assembly of claim 1 wherein the plug-on portion further comprises a first retaining portion and a second retaining portion, and wherein the engaging portion extends from the first retaining portion to the second retaining portion.

3. The stab assembly of claim 2 wherein the first retaining portion comprises a first wall and a second wall, wherein the first wall is disposed in a first plane, wherein the second wall is disposed in a second plane, wherein the first plane is parallel to and spaced from the second plane, wherein the first wall extends from the bolt-on portion, and wherein the second wall extends from the engaging portion.

4. The stab assembly of claim 1 wherein said number of edges of the mounting portion comprises a first edge and a second edge, wherein said number of elongated extensions further comprises another elongated extension, and wherein each of the first edge and the second edge is disposed between the plug-on elongated extension and the another elongated extension.

5. The stab assembly of claim 4 wherein said at least one twofold line terminal comprises a first twofold line terminal and a second twofold line terminal, wherein the edge of the bolt-on portion of the first twofold line terminal substantially overlays the first edge of the mounting portion, and wherein the edge of the bolt-on portion of the second twofold line terminal substantially overlays the second edge of the mounting portion.

6. The stab assembly of claim 4 wherein the edge of the bolt-on portion of said at least one twofold line terminal substantially overlays the first edge, wherein said number of line terminals further comprises another line terminal, wherein said another line terminal comprises a bolt-on portion engaging the mounting portion, wherein the bolt-on portion of said another line terminal has an edge defining a thru hole, and wherein the edge of said another line terminal substantially overlays the second edge.

7. The stab assembly of claim 1 wherein said number of elongated extensions further comprises another elongated extension, wherein said number of line terminals further comprises a onefold line terminal, wherein said onefold line terminal has a slot, wherein said onefold line terminal comprises a bolt-on portion engaging the mounting portion, wherein the bolt-on portion of said onefold line terminal has an edge defining a thru hole, wherein the edge of said onefold line terminal substantially overlays another corresponding one of the edges of said mounting portion, and wherein said another elongated extension extends through the slot.

8. The stab assembly of claim 7 wherein said onefold line terminal comprises a first wall, a second wall, a third wall, a fourth wall, and a fifth wall, wherein the first wall connects the bolt-on portion of said onefold line terminal to the second wall, wherein the second wall connects the first wall to the third wall, wherein the third wall connects the second wall to the fourth wall, wherein the fourth wall connects the third wall to the fifth wall, wherein the first wall is parallel to each of the third wall and the fifth wall, wherein each of the second wall and the fourth wall is perpendicular to the first wall, and wherein the slot is disposed in each of the second wall, the third wall, and the fourth wall.

9. A switchgear assembly for a panelboard, said panelboard comprising a backpan, said switchgear assembly comprising:
    a number of electrical switching apparatus each structured to be disposed on said backpan; and
    a stab assembly comprising:
        at least one bus bar comprising:

a mounting portion structured to be disposed on said backpan, the mounting portion comprising a number of edges each defining a respective aperture, and a number of elongated extensions each extending from the mounting portion into a corresponding one of the number of electrical switching apparatus, said number of elongated extensions comprising a plug-on elongated extension, and a number of line terminals comprising at least one twofold line terminal, said at least one twofold line terminal comprising:

a bolt-on portion engaging the mounting portion, the bolt-on portion having an edge defining a thru hole, the edge of the bolt-on portion substantially overlaying a corresponding one of the edges of the mounting portion, and a plug-on portion extending from the bolt-on portion, the plug-on portion comprising an engaging portion, wherein the engaging portion substantially overlays the plug-on elongated extension, and wherein the engaging portion engages the plug-on elongated extension.

10. The switchgear assembly of claim 9 wherein said number of electrical switching apparatus comprises at least one twofold electrical switching apparatus, wherein said at least one twofold electrical switching apparatus comprises a housing and a spring disposed within said housing, wherein said spring comprises a first clamping portion and a second clamping portion, wherein the first clamping portion engages the plug-on elongated extension, and wherein the second clamping portion engages the engaging portion of said at least one twofold line terminal.

11. The switchgear assembly of claim 10 wherein said number of electrical switching apparatus further comprises at least one onefold electrical switching apparatus, wherein said number of line terminals further comprises at least one onefold line terminal, wherein said at least one onefold line terminal has a slot, wherein said at least one onefold line terminal comprises a bolt-on portion engaging the mounting portion, wherein the bolt-on portion of said at least one onefold line terminal has an edge defining a thru hole, wherein the edge of said at least one onefold line terminal substantially overlays another corresponding one of the edges of said mounting portion, wherein said number of elongated extensions further comprises another elongated extension, wherein said another elongated extension extends through the slot, and wherein each of said another elongated extension and said at least one onefold line terminal extends into said at least one onefold electrical switching apparatus.

12. The switchgear assembly of claim 11 wherein said at least one twofold electrical switching apparatus comprises a plurality of twofold electrical switching apparatus, and wherein said at least one onefold electrical switching apparatus comprises a plurality of onefold electrical switching apparatus.

13. The switchgear assembly of claim 10 wherein said number of edges of the mounting portion comprises a first edge and a second edge, wherein said number of elongated extensions further comprises another elongated extension, and wherein each of the first edge and the second edge is disposed between the plug-on elongated extension and said another elongated extension.

14. The switchgear assembly of claim 13 wherein said stab assembly further comprises a first bolt and a second bolt, wherein the edge of the bolt-on portion of said at least one twofold line terminal substantially overlays the first edge, wherein said number of line terminals further comprises another line terminal, wherein said another line terminal comprises a bolt-on portion engaging the mounting portion, wherein the bolt-on portion of said another line terminal has an edge defining a thru hole, wherein the edge of said another line terminal substantially overlays the second edge, wherein said first bolt extends through each of the edge of the bolt-on portion of said at least one twofold line terminal and the first edge, wherein said first bolt is threadably connected to said at least one bus bar, wherein said second bolt extends through each of the edge of the bolt-on portion of said another line terminal and the second edge, wherein said second bolt is threadably connected to said at least one bus bar.

15. A panelboard comprising:
a backpan; and
a switchgear assembly comprising:
a number of electrical switching apparatus each disposed on said backpan; and
a stab assembly comprising:
at least one bus bar comprising:
a mounting portion disposed on said backpan, the mounting portion comprising a number of edges each defining a respective aperture, and
a number of elongated extensions each extending from the mounting portion into a corresponding one of the number of electrical switching apparatus, said number of elongated extensions comprising a plug-on elongated extension, and
a number of line terminals comprising at least one twofold line terminal, said at least one twofold line terminal comprising:
a bolt-on portion engaging the mounting portion, the bolt-on portion having an edge defining a thru hole, the edge of the bolt-on portion substantially overlaying a corresponding one of the edges of the mounting portion, and
a plug-on portion extending from the bolt-on portion, the plug-on portion comprising an engaging portion,
wherein the engaging portion substantially overlays the plug-on elongated extension, and
wherein the engaging portion engages the plug-on elongated extension.

16. The panelboard of claim 15 wherein said number of edges of the mounting portion comprises a first edge and a second edge, wherein said number of elongated extensions further comprises another elongated extension, wherein each of the first edge and the second edge is disposed between the plug-on elongated extension and the another elongated extension, wherein the edge of the bolt-on portion of said at least one twofold line terminal substantially overlays the first edge, wherein said number of line terminals further comprises another line terminal, wherein said another line terminal comprises a bolt-on portion engaging the mounting portion, wherein the bolt-on portion of said another line terminal has an edge defining a thru hole, and wherein the edge of said another line terminal substantially overlays the second edge.

17. The panelboard of claim 15 wherein said number of elongated extensions further comprises another elongated extension, wherein said number of line terminals further comprises a onefold line terminal, wherein said onefold line terminal has a slot, wherein said onefold line terminal comprises a bolt-on portion engaging the mounting portion, wherein the bolt-on portion of said onefold line terminal has an edge defining a thru hole, wherein the edge of said onefold line terminal substantially overlays another corresponding one of the edges of said mounting portion, and wherein said another elongated extension extends through the slot.

18. The panelboard of claim 17 wherein said onefold line terminal comprises a first wall, a second wall, a third wall, a fourth wall, and a fifth wall, wherein the first wall connects the bolt-on portion of said onefold line terminal to the second wall, wherein the second wall connects the first wall to the third wall, wherein the third wall connects the second wall to the fourth wall, wherein the fourth wall connects the third wall to the fifth wall, wherein the first wall is parallel to each of the third wall and the fifth wall, wherein each of the second wall and the fourth wall is perpendicular to the first wall, and wherein the slot is disposed in each of the second wall, the third wall, and the fourth wall.

19. The panelboard of claim 15 wherein said number of electrical switching apparatus comprises at least one twofold electrical switching apparatus, wherein said at least one twofold electrical switching apparatus comprises a housing and a spring disposed within said housing, wherein said spring comprises a first clamping portion and a second clamping portion, wherein the first clamping portion engages the plug-on elongated extension, and wherein the second clamping portion engages the engaging portion of said at least one twofold line terminal.

20. The panelboard of claim 19 wherein said number of elongated extensions further comprises another elongated extension, wherein said number of electrical switching apparatus further comprises at least one onefold electrical switching apparatus, wherein said number of line terminals further comprises at least one onefold line terminal, wherein said at least one onefold line terminal has a slot, wherein said at least one onefold line terminal comprises a bolt-on portion engaging the mounting portion, wherein the bolt-on portion of said at least one onefold line terminal has an edge defining a thru hole, wherein the edge of said at least one onefold line terminal substantially overlays another corresponding one of the edges of said mounting portion, wherein said another elongated extension extends through the slot, and wherein each of said another elongated extension and said at least one onefold line terminal extends into said at least one onefold electrical switching apparatus.

* * * * *